US010436369B2

(12) United States Patent
Jefferson et al.

(10) Patent No.: US 10,436,369 B2
(45) Date of Patent: Oct. 8, 2019

(54) HIGH EFFICIENCY TAKE-OFF FITTING

(71) Applicant: Ductmate Industries, Inc., East Monongahela, PA (US)

(72) Inventors: Alvin L. Jefferson, Pittsburgh, PA (US); David E. Overdorff, II, Ruffs Dale, PA (US); Duane Fetko, Masontown, PA (US); Branden Butella, McKeesport, PA (US); David Agee, Finleyville, PA (US)

(73) Assignee: Ductmate Industries, Inc., Charleroi, PA (US)

( * ) Notice: Subject to any disclaimer, the term of this patent is extended or adjusted under 35 U.S.C. 154(b) by 784 days.

(21) Appl. No.: 13/965,423

(22) Filed: Aug. 13, 2013

(65) Prior Publication Data

US 2014/0049038 A1    Feb. 20, 2014

Related U.S. Application Data

(60) Provisional application No. 61/682,938, filed on Aug. 14, 2012, provisional application No. 61/682,856, filed on Aug. 14, 2012.

(51) Int. Cl.
*F16L 41/00* (2006.01)
*F16L 41/08* (2006.01)

(52) U.S. Cl.
CPC ........... *F16L 41/088* (2013.01); *F16L 41/004* (2013.01)

(58) Field of Classification Search
USPC ............... 285/203, 208, 210, 194, 140.1, 43
See application file for complete search history.

(56) References Cited

U.S. PATENT DOCUMENTS

| | | | | |
|---|---|---|---|---|
| 567,115 A | * | 9/1896 | Ftkinson et al. | 285/210 |
| 593,025 A | * | 11/1897 | Morrison | 285/210 |
| 608,174 A | * | 8/1898 | Byrnes | 285/210 |
| 620,484 A | * | 2/1899 | Mueller | 285/210 |
| 621,108 A | * | 3/1899 | Leonard | 285/210 |
| 757,641 A | * | 4/1904 | Saunders | 285/210 |
| 833,239 A | * | 10/1906 | Plunkett | 285/210 |
| 862,415 A | * | 8/1907 | Rohrer | 285/43 |
| 945,517 A | * | 1/1910 | Goodwin | 285/210 |
| 1,043,230 A | * | 11/1912 | Henderson | 285/210 |
| 1,169,691 A | * | 1/1916 | Elmo | 222/90 |
| 2,472,569 A | * | 6/1949 | Caldwell et al. | 285/210 |
| 2,910,308 A | | 10/1959 | Carr | |
| 4,023,833 A | * | 5/1977 | Wellard | 285/179 |
| 4,438,960 A | | 3/1984 | Carroll et al. | |
| 4,627,648 A | * | 12/1986 | Montpetit | 285/197 |
| 4,750,411 A | | 6/1988 | Eversole | |
| 4,909,566 A | | 3/1990 | Hashimoto et al. | |
| 4,995,648 A | | 2/1991 | Jackson | |
| 5,087,084 A | | 2/1992 | Gehring | |
| 5,095,942 A | | 3/1992 | Murphy | |
| 5,219,403 A | | 6/1993 | Murphy | |
| 5,240,288 A | | 8/1993 | Inda et al. | |
| 5,328,212 A | * | 7/1994 | Kosik et al. | 285/42 |
| 5,586,789 A | * | 12/1996 | Bently | 285/38 |
| 5,678,953 A | | 10/1997 | Usui et al. | |
| 5,755,463 A | | 5/1998 | Davidson | |

(Continued)

*Primary Examiner* — Aaron M Dunwoody

(74) *Attorney, Agent, or Firm* — The Webb Law Firm

(57) ABSTRACT

A high efficiency take-off fitting allows conditioned air from a rectangular cross-section main duct to be smoothly transferred into a circular cross-section branch duct.

8 Claims, 6 Drawing Sheets

(56) References Cited

U.S. PATENT DOCUMENTS

| | | | |
|---|---|---|---|
| 5,901,985 A * | 5/1999 | Raatz | 285/38 |
| 5,957,506 A | 9/1999 | Stepp | |
| 6,173,997 B1 | 1/2001 | Nordstrom et al. | |
| 6,231,704 B1 | 5/2001 | Carpinetti | |
| 6,601,351 B1 * | 8/2003 | Zerfoss | 52/198 |
| 6,884,159 B1 | 4/2005 | Ferraud, Jr. | |
| 7,032,368 B2 | 4/2006 | Funk et al. | |
| 7,232,370 B1 | 6/2007 | Newell | |
| 7,410,416 B2 | 8/2008 | Fettkether | |
| 7,488,010 B2 | 2/2009 | Wellman et al. | |
| 7,771,259 B2 | 8/2010 | Pettit | |
| 7,992,903 B1 | 8/2011 | Desimone | |
| 8,485,561 B2 | 7/2013 | Guo | |
| 2002/0125721 A1 | 9/2002 | Imaeda et al. | |
| 2003/0051764 A1 | 3/2003 | Jungers | |
| 2011/0232335 A1 * | 9/2011 | Johnson et al. | 68/19 |
| 2013/0180204 A1 | 7/2013 | Metz et al. | |

* cited by examiner (Prior Art)

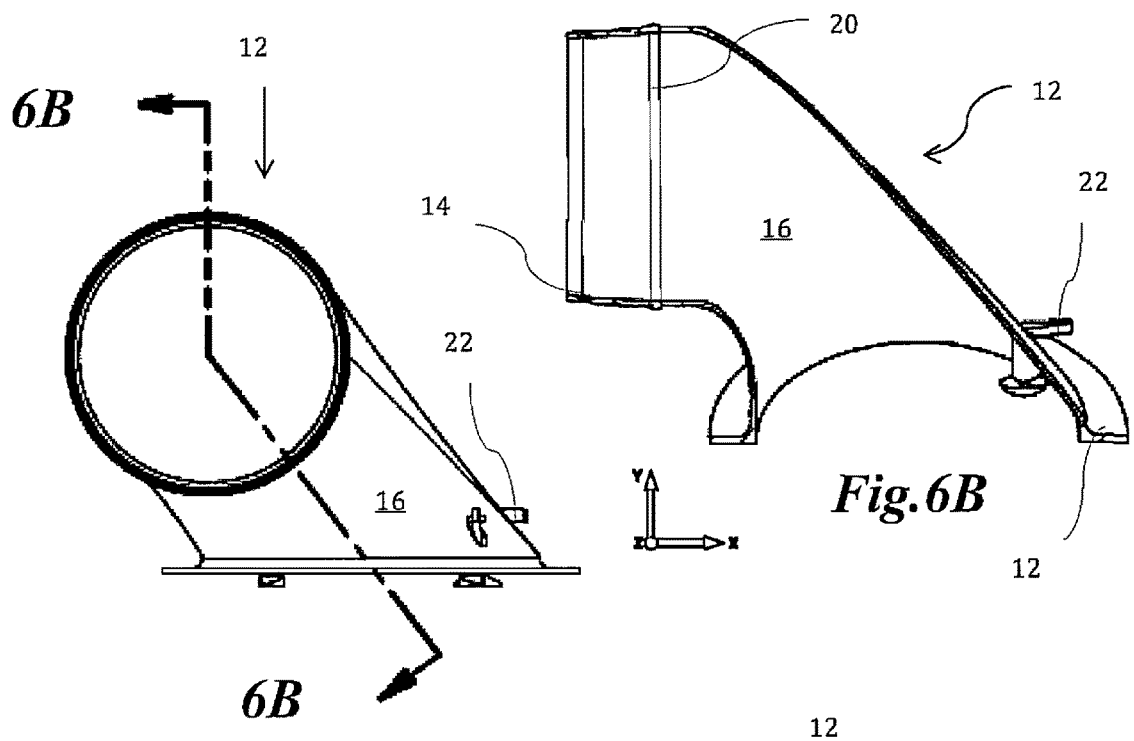
*Fig.6A*
*Fig.6B*
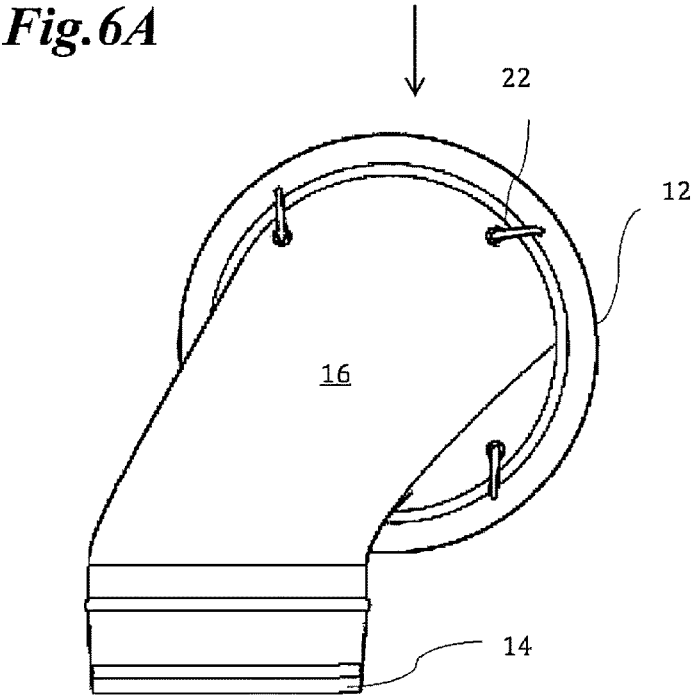
*Fig.6C*

HIGH EFFICIENCY TAKE-OFF FITTING

CROSS-REFERENCE TO RELATED APPLICATIONS

This application claims the benefit of U.S. Provisional Application Nos. 61/682,938 and 61/682,856, both filed Aug. 14, 2012 and both of which are hereby incorporated by reference in their entireties.

TECHNICAL FIELD

The invention relates to air conditioning and heating ductwork, and particularly to a fitting for connecting a main duct to a branch duct.

BACKGROUND

In conveying heated or cooled air from a furnace or an air conditioner, the air is usually conducted to a rectangular cross-section main duct and thereafter through branch ducts that extend from the main duct. In recent years, these branch ducts have been formed from sealed circular cross-section sheet metal pipe. These branch ducts then carry the conditioned air to registers that open into rooms in the building to permit circulation of the conditioned air within the rooms.

The transition of air from the main duct to the branch duct has not been very efficient because the branch ducts usually extend at right angles to the main duct causing turbulence in the air as it transfers. Further, the type of fittings used previously has required extensive sealing to prevent leakage of air through the joints. Newer building codes now require that there be minimal leakage in the heating and air conditioning systems.

The fitting of the present invention increases both the efficiency of the flow of air through the system and the ease of assembly of the system as will be seen as the description proceeds in conjunction with the attached drawings and the appended claims.

BRIEF SUMMARY OF THE INVENTION

The present invention is a high efficiency fitting for conveying heated or cooled air from a main duct to a branch duct. The fitting has a bottom flange adapted to be sealingly attached to rectangular cross-section main duct for conditioned air. The fitting has a circular cross-section exit pipe receptor adapted to sealingly mate with a circular cross-section branch duct conveying conditioned air away from the main duct. A molded transitional body connects the bottom flange and the exit pipe receptor to provide a smooth transition of air flow from the rectangular cross-section main duct to the exit pipe receptor. The molded transitional body is formed of heat resistant rigid material. Quick fasteners are provided to fasten the bottom flange of the fitting to the rectangular cross-section main duct.

In order to place the fitting onto the main duct, a template may be provided to show where the hole for the opening of the flange is made. The fitting itself is provided in two forms that are mirror images of each other, one fitting for a take-off ("take-off," will include all forms such as takeoff or take off) to the right of the main duct and one for a take-off to the left of the main duct with the direction of airflow. The fitting may be of various sizes, but the diameter where the fitting forms the main duct at the flange end of the fitting is always greater than the diameter of the circular pipe receptor.

BRIEF DESCRIPTION OF THE DRAWINGS

FIGS. 6A-6C show the offset fitting.

DETAILED DESCRIPTION

Figure 1:
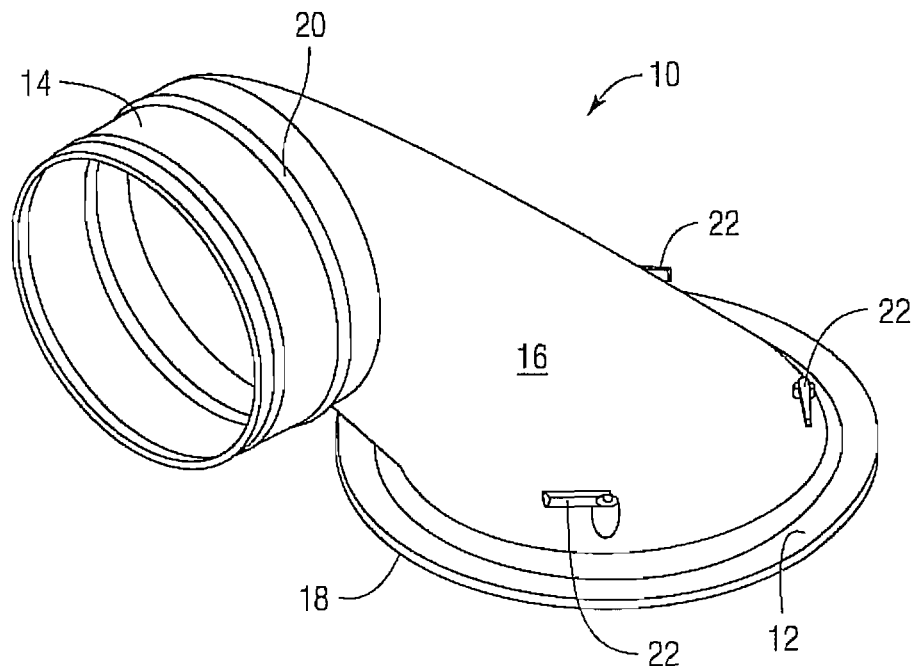
FIG. 1 is a perspective view of the high-efficiency fitting of the present invention.
Figure 2:
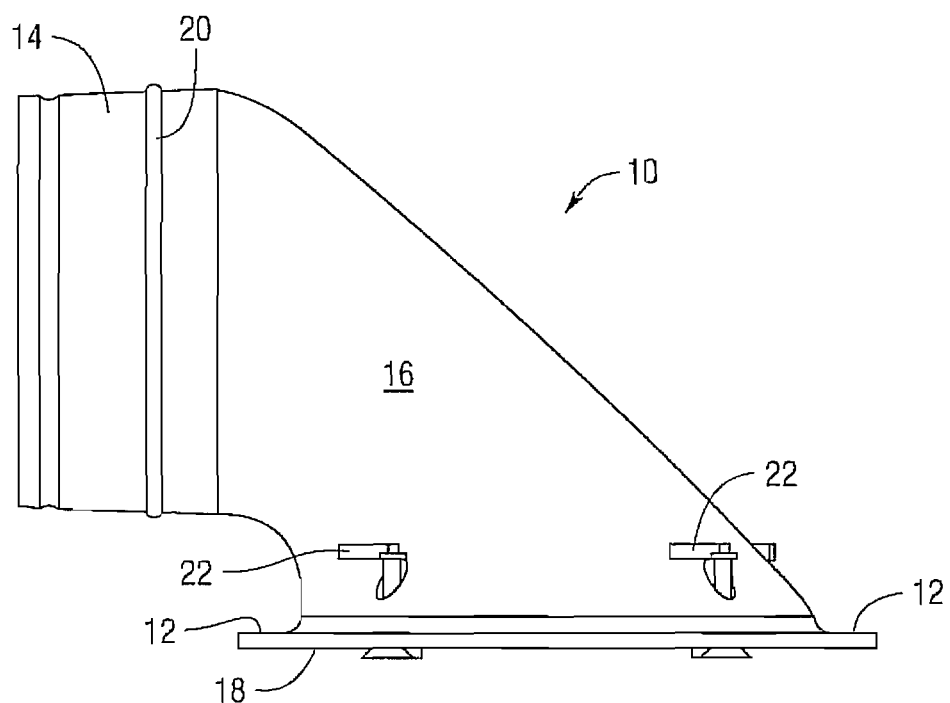
FIG. 2 is a side elevation of the fitting of FIG. 1.
Figure 3:
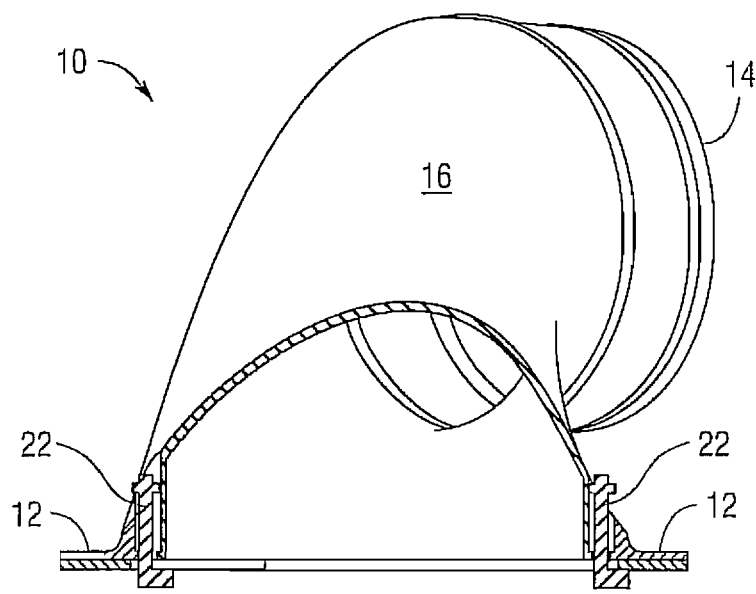
FIG. 3 is a rear elevation of the fitting of FIG. 1 partially in section to show the quick fastener.
Figure 4:
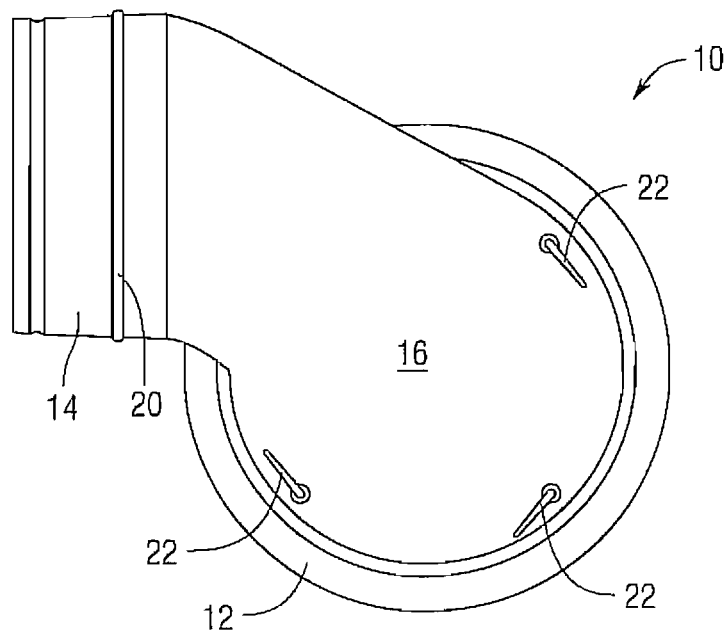
FIG. 4 is a top plan view of the fitting of FIG. 1.
Figure 5A:
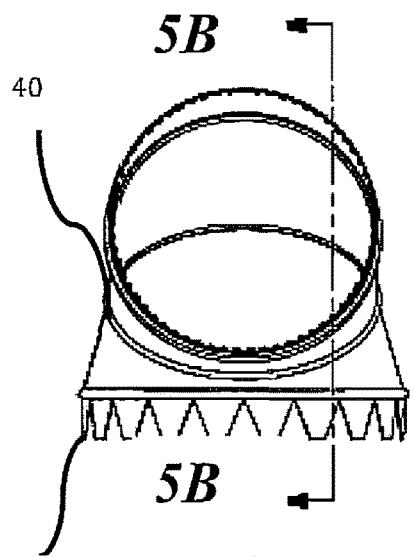
FIGS. 5A-5D show the prior art 90 degree take-off.
Figure 5B:
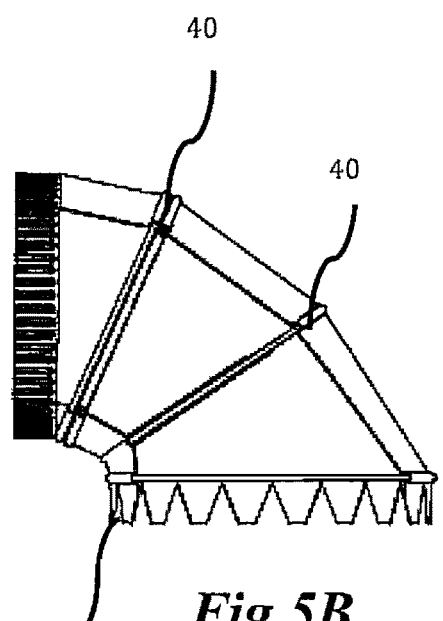
Figure 5C:
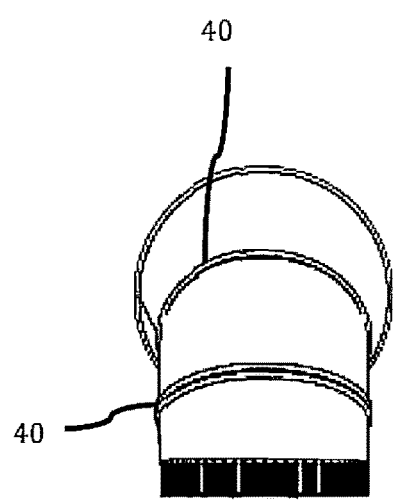
Figure 5D:
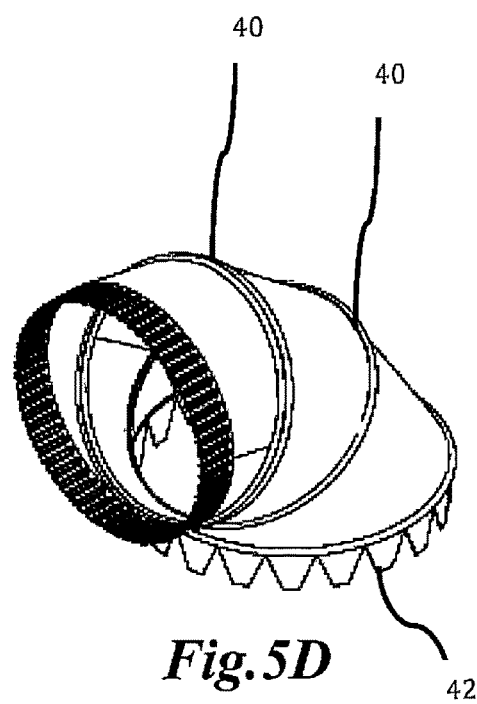

Referring to the drawings, a high efficiency take-off fitting 10 has a bottom flange 12 and a circular exit pipe receptor 14. The flange 12 and pipe receptor 14 are connected by a transitional body 16 that is molded to form complex curves that ease the transition of air from flowing in the main duct to that flowing into the branch ducts. The complex curves are created by an offset from the center line of one opening with the center line of the other opening in the direction of the duct that it is being attached to. If viewing in an x, y, z plane, the offset would be in the z direction, with an opening in the x-plane and the other opening in the y-plane.

Additionally, by having a smooth inside with no transitions or transverse seams turbulence is reduced and air flow is increased.

The flange 12 has sealing material 18 affixed to its bottom side so that it is automatically sealing to the main duct. It could be a gasket or other liquid applied gasketing material. In similar fashion, the circular exit pipe receptor 14 can have gasketing material 20 affixed to its periphery or it could be attached to a pipe having sealing material. The circular pipe receptor 14 can have an indentation to receive sealant material located on a pipe. Quick fasteners 22 provide a one-turn mechanism to lock the flange 12 to the main duct. The quick fasteners 22 are one type of integral mechanical fasteners that can be used. The integral mechanical fasteners should take less time to install than using tech screws. Preferably, the integral mechanical fasteners would not include having to reach inside of the fitting. An integral mechanical fastener would not include the prior art metal tabs 42.

It will be seen that since the flange 12 has gasketing material 18 affixed to it and since the exit pipe receptor 14 has gasketing material 20 affixed to it, when the fitting 10 is positioned in place it is automatically sealed to create an air tight assembly. Examples can be pressure sensitive foam tapes and gaskets including but not limited to polyethylene foam. Other examples include Ductmate 440 Gasket Tape (isobutylene) or any other butyl gaskets. Additional examples include Gasket Tape Neoprene/Urethane and EPDM Gaskets.

Figure 7A:
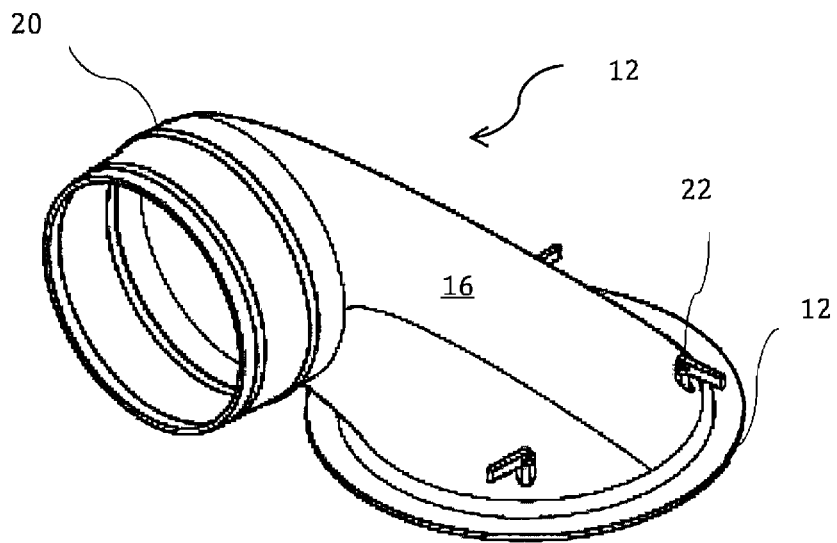
FIGS. 7A-7B show the mirror image fittings for use to transfer air from a main duct one for the left and one for the right direction from the duct.
Figure 7B:
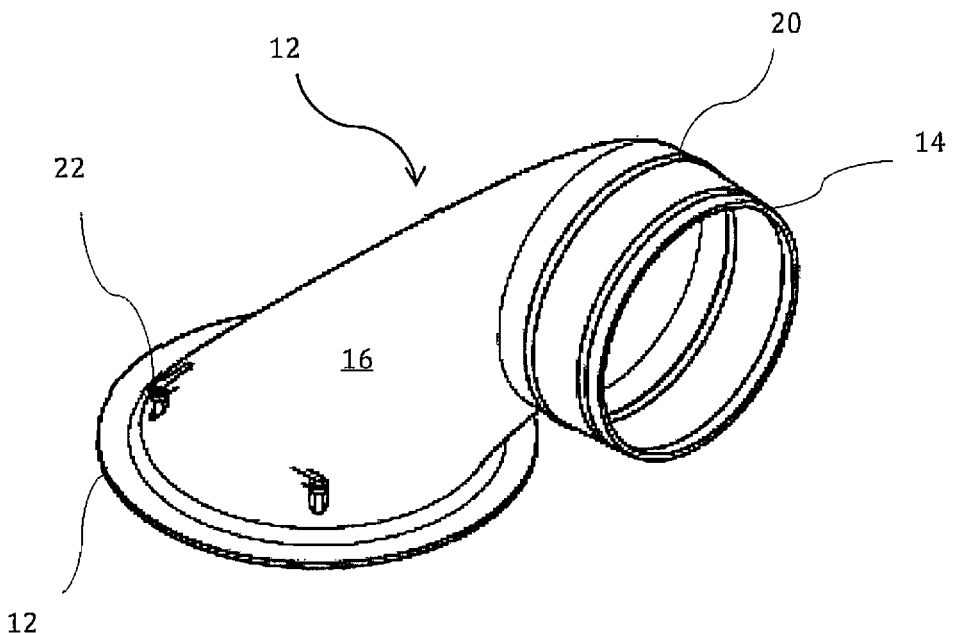

Further, while the drawings illustrate a left take-off fitting 10, the right take-off fitting is structurally the same as, but a mirror image of, the left take-off fitting 10 that is illustrated (see FIGS. 7A and 7B . Two different molds can be used. Molded transitional body 16 can be formed from many suitable materials. One material that is useful is high strength carbon fiber which can be either carbon fiber-reinforced composite or plastic to form the body 16.

From the foregoing description of the invention, it can readily be seen that the fasteners 22 facilitate installation which reduces the time required to be spent by the installer. The transitional fitting 10 is energy efficient. The fitting 10 has an aerodynamic design with a smooth inner surface without sharp angles or transverse seams and the center line of the ends are offset which creates a pressure drop across the fitting 10 which means that less energy is required to move a given amount of air. The pressure drop and previously described features are partly enabled by the molded construction. The design lessens turbulence and increases air flow over prior art sheet metal designs. By offset, we mean the fitting to the branch duct is downstream from the flange opening, not directly at the take-off point. This means the transitional body 16 turns in two directions, not just one as in the conventional take-off unit. That is, instead of moving the air directly upwards to turn immediately right or left, it curves in the direction of flow and then to the right or left, or in a combined, complex curve. Another example can be seen in the x, y, and z planes. One opening is in the x-plane. The second opening is in the y-plane. The center line of the second opening is offset from the center line of the opening in the z direction. Clearly, if less energy is required to move a given amount of air, either the power to move the same amount of air may be reduced or a greater amount of air may be moved by the same amount of power. Less turbulence and/or less resistance could allow for using a smaller diameter branch duct that is, you could get the same amount of air through a smaller duct. Alternatively, a small blower may be used or the current blower may run less and reduce power consumption and reduce utility cost for the building owner. An oval-shaped or otherwise longer opening in the main duct having a corresponding oval shape for the flange may also reduce turbulence at the entrance to the take-off. The preferred embodiment has circular or round openings on both ends.

FIGS. 5A-5D show the prior art residential 90 degree take-off. As can be seen the prior art has many transverse joints 40 that are a source of air leakage and turbulence in an HVAC system. Typically, an installer would have to paint or seal the joints 40. Additionally, as can be seen, tabs are used to connect that require the installer to reach into the take-off and bend sharp tabs which is difficult and can often lead to injury in the form of cuts.

Figure 8:
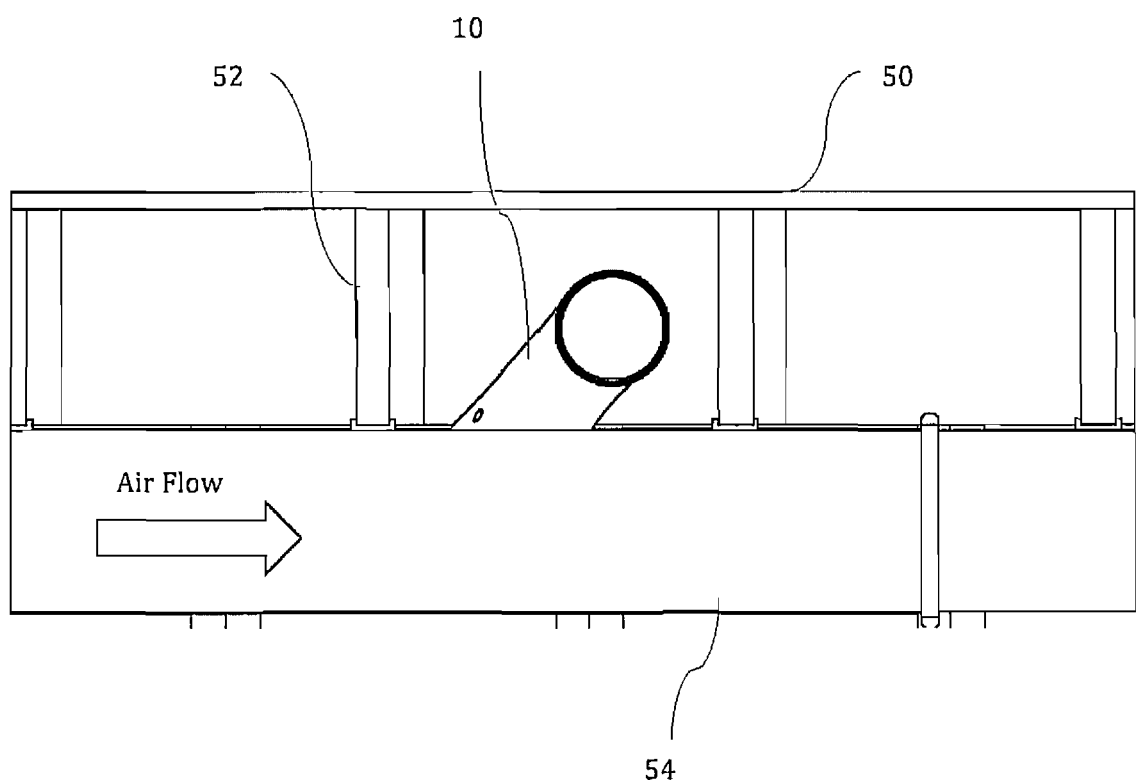
FIG. 8 shows the fitting attached to a main duct that is attached to the joists in a structure in a side elevation view.

FIGS. 6A-6C show the offset of the center line from one end to the second end. It also demonstrates the x, y, z plane. FIG. 6B shows an opening in the x-plane, a second opening in the y-plane and the offset of the center line of the openings in the z-plane. FIG. 8 shows the take-off 10 as installed in a typical residential system. While the take-off can be used in many settings it is preferably used in connection with the typical residential system. As shown, the main duct 54 runs perpendicular to and underneath the floor joists 52. The floor joists support the floor and the vertical space between the main duct 54 and the floor 50 is limited and that is typically where the branch ducts run between the floor joists so that they are above the bottom of the joists 52. The horizontal space between the joists is between 12 and 24 inches with 16 inches being the most common in a residential setting. The vertical height is typically from 5½ inches to 11¼ inches with the most common being 5½ inches depending on whether 2×6, 2×8, 2×10 or 2×12 joists are used. Preferably the take-off 10 has a vertical measurement of less than 5½ inches and an outer width of less than 16 inches. As can be seen, having the offset requires increasing the overall width of the fitting 10 from the prior art.

The following tables show the improved air flow through a duct system having the take-off as claimed and described versus the prior art take-off. It should be noted that the take-off was also connected with an improved register as shown in Provisional Application Ser. No. 61/682,856, filed Aug. 14, 2012, so that the improvement is combined improvement. The measure is air flow through the prior art system shown in Table A. In Table B, the prior art take-off was replaced with the take-off claimed and described.

TABLE A

Prior Art

| Target FPM | | Actual FPM | CFM |
|---|---|---|---|
| 2 × 4 Duct | 360 | 370.8 | 103.0824 |
| 6" Pipe | 507 | 560 | |
| Trk Duct | | 1214.3 | 1517.875 |

TABLE B

New

| Target FPM | | Actual FPM | CFM |
|---|---|---|---|
| 2 × 4 Duct | 360 | 419.6 | 116.6488 |
| 6" Pipe | 507 | 608 | 119.32 |
| Trk Duct | | 1153.4 | 1441.75 |

Various changes could be made in the above constructions and method without departing from the scope of the invention as defined in the claims below. It is intended that all matter contained in the above description, as shown in the accompanying drawings, shall be interpreted as illustrative and not limiting.

10 duct transitional fitting
12 bottom flange
14 circular exit pipe receptor
16 transitional body
18 gasketing material on 12
20 gasketing material on 14
22 fastener
40 joint
42 prior art tab fastener
50 floor
52 joist
54 main duct

We claim:

1. A high efficiency fitting for conveying heated or cooled air from a main duct to a branch duct comprising:
   (a) a bottom flange adapted to be sealingly attached to a rectangular cross-section main duct for conveying conditioned air;
   (b) a circular cross-section exit pipe receptor adapted to sealingly mate with a circular branch duct conveying conditioned air away from the main duct;
   (c) a curved molded transitional body that changes the direction of airflow within the curved molded transitional body, the curved molded transitional body connects the bottom flange and the exit pipe receptor to provide a smooth transition of air flow from the rectangular cross-section main duct to the exit pipe receptor wherein a center line of the bottom flange is offset from a center line of the circular cross-section exit pipe receptor; and
   (d) the molded transitional body being formed of heat resistant rigid material.

2. The high efficiency fitting of claim 1 wherein a gasketing material is fixed to the flange of the fitting to seal the fitting to the rectangular cross-sectional main duct.

3. The high efficiency fitting of claim 1 wherein a gasketing material is fixed to the circular exit pipe receptor to seal the fitting to a circular exit pipe that will carry conditioned air away from the main duct.

4. The high efficiency fitting of claim 1 wherein the fitting is molded from a high-strength, heat resilient material.

5. The high efficiency fitting of claim 1 wherein quick single turn fasteners are integral and used to efficiently attach the fitting to the main duct.

6. The high efficiency fitting of claim 1 including an integral mechanical fastener to assist in fastening the high efficiency fitting to the rectangular cross-section main duct.

7. The high efficiency fitting of claim 1 wherein the integral mechanical fastener also allows for adjustment based on the width and location of the main duct.

8. A high efficiency take-off comprising:
(a) a curved body:
(b) an end at one end of the curved body to attach to a main duct; and
(c) a second end of the curved body to attach to a branch duct that directs air 90 degrees from the main duct, the center line of the second end is offset from the center line the end in the z direction.

* * * * *